(12) United States Patent
Alshammari

(10) Patent No.: US 11,719,361 B2
(45) Date of Patent: Aug. 8, 2023

(54) REMOTE SEALS FOR SELF-REGULATING VALVES

(71) Applicant: Saudi Arabian Oil Company, Dhahran (SA)

(72) Inventor: Sultan Maseer Alshammari, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 123 days.

(21) Appl. No.: 17/171,609

(22) Filed: Feb. 9, 2021

(65) Prior Publication Data

US 2022/0252182 A1 Aug. 11, 2022

(51) Int. Cl.
| | | |
|---|---|---|
| *F16K 41/10* | (2006.01) | |
| *F16K 31/126* | (2006.01) | |
| *F16K 31/365* | (2006.01) | |
| *F16K 31/38* | (2006.01) | |

(52) U.S. Cl.
CPC .......... *F16K 41/103* (2013.01); *F16K 31/126* (2013.01); *F16K 31/365* (2013.01); *F16K 31/38* (2013.01)

(58) Field of Classification Search
CPC .... F16K 41/103; F16K 31/126; F16K 31/365; F16K 31/38; Y10T 137/7762; Y10T 137/7764; Y10T 137/7769
See application file for complete search history.

(56) References Cited

U.S. PATENT DOCUMENTS

| | | | | |
|---|---|---|---|---|
| 843,174 | A | * | 2/1907 | Reynolds ............. G05D 16/163 236/80 R |
| 863,900 | A | * | 8/1907 | Broadhead ............ F16K 17/105 137/505.22 |
| 871,260 | A | * | 11/1907 | Dyer .................... G05D 16/163 137/489.5 |
| 1,991,309 | A | * | 2/1935 | Annin .................... G05B 11/50 236/82 |
| 2,059,121 | A | * | 10/1936 | Lake .................... G05D 16/163 251/33 |
| 3,097,664 | A | * | 7/1963 | Henley .................... G05D 7/03 137/487 |
| 4,274,440 | A | * | 6/1981 | Richard, Jr. ......... G05D 16/163 137/489 |
| 4,339,111 | A | | 7/1982 | Welch |
| 4,944,249 | A | * | 7/1990 | Takeuchi ............. G05D 16/163 119/14.44 |

(Continued)

*Primary Examiner* — Umashankar Venkatesan
(74) *Attorney, Agent, or Firm* — Fish & Richardson P.C.

(57) ABSTRACT

A valve includes a valve body with an inlet and an outlet coupled to a tubular conduit operable to circulate a flow of a process fluid, an actuator with an interior volume divided by a valve diaphragm into a first volume portion that encloses a working fluid and a second volume portion, and a plug coupled to the valve diaphragm and operable to move toward an open position or a closed position based on movement of the valve diaphragm relative to a pressure of the working fluid. A seal isolator is coupled to the tubular conduit and includes an isolator diaphragm having a first side exposed to the flow of the fluid and a second side fluidly coupled to the first volume portion through the working fluid. The isolator diaphragm is configured to transmit a pressure of the flow of the process fluid to the pressure of the working fluid.

18 Claims, 3 Drawing Sheets

(56) References Cited

U.S. PATENT DOCUMENTS

| | | | | |
|---|---|---|---|---|
| 5,323,799 A | * | 6/1994 | Pengler | G05D 16/185 |
| | | | | 137/115.14 |
| 6,135,142 A | * | 10/2000 | Yokota | F16K 31/124 |
| | | | | 137/486 |
| 6,418,956 B1 | * | 7/2002 | Bloom | G05D 16/185 |
| | | | | 137/488 |
| 6,672,561 B2 | | 1/2004 | Kerg et al. | |
| 7,044,156 B2 | * | 5/2006 | Webster | E21B 43/01 |
| | | | | 137/488 |
| 9,389,106 B2 | | 7/2016 | Breen et al. | |
| 9,476,510 B2 | | 10/2016 | Buhler | |
| 2003/0042459 A1 | | 3/2003 | Gregoire | |
| 2004/0261855 A1 | * | 12/2004 | Hart | G05D 7/03 |
| | | | | 137/486 |
| 2005/0150560 A1 | | 7/2005 | Amato | |
| 2018/0163896 A1 | | 6/2018 | Mueller et al. | |

\* cited by examiner

REMOTE SEALS FOR SELF-REGULATING VALVES

TECHNICAL FIELD

The present disclosure describes remote seals for self-regulating valves.

BACKGROUND

There are many different types of valves used in hydrocarbon production and transfer, such as through pipelines and other tubular systems. In some cases, a fluid that flows through a pipeline is unprocessed or yet to be cleaned or purified. In such cases, the fluid may have particles or other impurities that can, for example, clog or cause a valve to malfunction or not perform optimally.

SUMMARY

In an example implementation, a valve system includes a valve and a seal isolator. The valve includes a valve body that includes an inlet configured to couple to a tubular conduit operable to circulate a flow of a process fluid, and an outlet configured to couple to the tubular conduit, an actuator that includes an interior volume divided by a valve diaphragm into a first volume portion that at least partially encloses a working fluid and a second volume portion, and a plug coupled to the valve diaphragm and operable to move toward an open position to allow the flow of the process fluid through the valve body or toward a closed position to disallow the flow of the process fluid through the valve body based on movement of the valve diaphragm relative to a pressure of the working fluid. The seal isolator is coupled to the tubular conduit and includes an isolator diaphragm having a first side exposed to the flow of the fluid and a second side fluidly coupled to the first volume portion through the working fluid. The isolator diaphragm is configured to transmit a pressure of the flow of the process fluid to the pressure of the working fluid.

In an aspect combinable with the example implementation, the seal isolator is configured to couple to the tubular conduit downstream of the valve body.

In another aspect combinable with any of the previous aspects, the isolator diaphragm is configured to transmit the pressure of the flow of the fluid to the working fluid at a one-to-one ratio.

In another aspect combinable with any of the previous aspects, the working fluid includes a gas.

In another aspect combinable with any of the previous aspects, the gas includes air.

In another aspect combinable with any of the previous aspects, the valve body includes an anti-cavitation trim body.

Another aspect combinable with any of the previous aspects further includes a controller in fluid communication with the first side of the isolator diaphragm and the first volume portion of the actuator, the controller configured to generate a pressure signal based on the pressure of the flow of the process fluid.

In another aspect combinable with any of the previous aspects, the pressure signal includes a capillary fluid.

Another aspect combinable with any of the previous aspects further includes a valve positioner coupled to the actuator and configured to receive the pressure signal from the controller and adjust the pressure of the working fluid based on the pressure signal.

In another aspect combinable with any of the previous aspects, the isolator diaphragm fluidly separates the process fluid from the valve diaphragm.

In another example implementation, a method includes receiving a flow of a process fluid in a tubular conduit at a valve that includes a valve body with an inlet coupled to the tubular conduit and an outlet coupled to the tubular conduit; receiving the flow of the process fluid at a seal isolator, coupled to the tubular conduit, that includes an isolator diaphragm having a first side exposed to the flow of the process fluid; transmitting a pressure of the process fluid through the isolator diaphragm to a working fluid at least partially enclosed within an actuator of the valve; adjusting a pressure of the working fluid based on the pressure of the process fluid; moving a valve diaphragm of the valve based on adjusting the pressure of the working fluid; and adjusting a plug coupled to the valve diaphragm toward an open position to allow the flow of the process fluid through the valve body or a closed position to disallow the flow of the process fluid through the valve body based on movement of the valve diaphragm relative to the pressure of the working fluid.

In an aspect combinable with the example implementation, receiving the flow of the process fluid at the seal isolator includes receiving the flow of the process fluid at the seal isolator downstream of the valve body.

In another aspect combinable with any of the previous aspects, transmitting the pressure of the process fluid through the isolator diaphragm to the working fluid includes transmitting the pressure of the process fluid through the isolator diaphragm to the working fluid at a one-to-one ratio.

In another aspect combinable with any of the previous aspects, the working fluid includes a gas.

In another aspect combinable with any of the previous aspects, the gas includes air.

In another aspect combinable with any of the previous aspects, the valve body includes an anti-cavitation trim body.

Another aspect combinable with any of the previous aspects further includes generating a pressure signal with a controller in fluid communication with the isolator diaphragm and the actuator based on the pressure of the flow of the process fluid.

In another aspect combinable with any of the previous aspects, generating the pressure signal includes generating the pressure signal with a capillary fluid.

Another aspect combinable with any of the previous aspects further includes adjusting the pressure of the working fluid with a valve positioner coupled to the actuator based on the pressure signal.

In another aspect combinable with any of the previous aspects, the isolator diaphragm fluidly separates the process fluid from the valve diaphragm.

In another aspect combinable with any of the previous aspects, the process fluid includes an untreated hydrocarbon fluid.

Implementations of a self-regulating valve system according to the present disclosure may include one or more of the following features. For example, a self-regulating valve system according to the present disclosure can provide a stable valve and regulation of a process flow when the fluid of the process flow is muddy, dirty, or otherwise uncleaned or unprocessed. As another example, a self-regulating valve system according to the present disclosure can therefore reduce or eliminate clogging of the valve due to the dirty process fluid. As a further example, a self-regulating valve system according to the present disclosure can reduce a downtime of a process flow system by replacing conventional, non-insulated process control valves. As another example, a self-regulating valve system according to the present disclosure can operate with no or little communication to a remotely located control system, which requires communication equipment. Also, a self-regulating valve system according to the present disclosure can have an extended operational life relative to conventional process control valves by including an isolation assembly that also provides a control signal to the valve.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
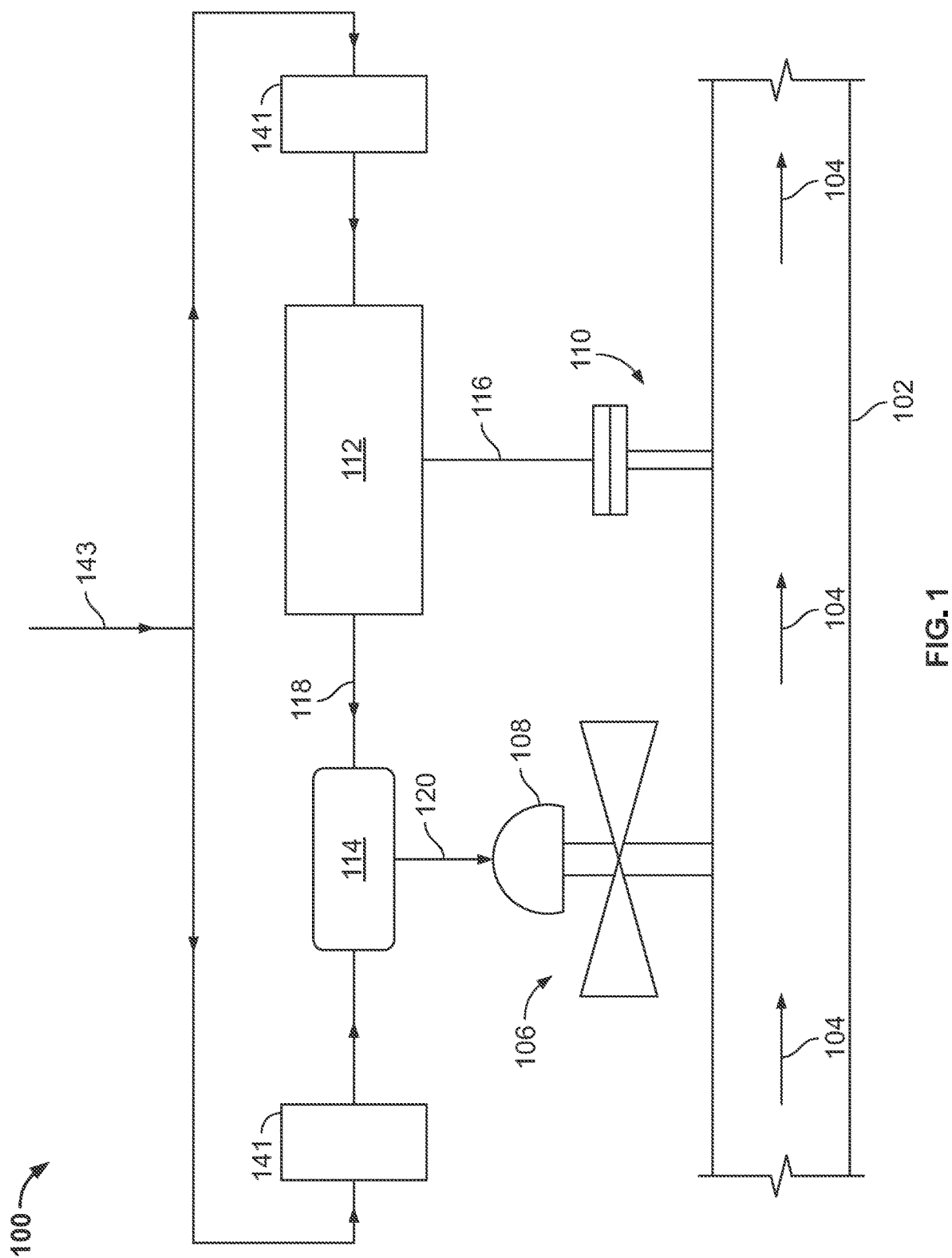
FIG. 1 is a schematic diagram of a self-regulating valve system according to the present disclosure.

FIG. 1 is a schematic diagram of a self-regulating valve system 100 according to the present disclosure. Generally, the self-regulating valve system 100 operates to regulate (for example, reduce or increase a volumetric flow rate) a flow of a process fluid 104 that is flowing through a tubular conduit 102. In some aspects, the self-regulating valve system 100 operates to regulate the flow of the process fluid 104 by opening or closing (for example modulating to and including an open position or to and including a closed position) a valve 106 based on a pressure of the process fluid 104. For example, in the implementation of the self-regulating valve system 100 shown in FIG. 1, the pressure of the process fluid 104 can exclusively (for example, without any further external control signal) provide a signal to the valve 106 to open or close. Thus, the self-regulating valve system 100 relies on the pressure of the process fluid 104 in order to control operation of the valve 106.

In this example implementation, the process fluid 104 is or includes a hydrocarbon fluid or other fluid (gas, liquid, or mixed-phase) that can be used in the hydrocarbon exploration and production industry (such as brine or saltwater). In some aspects, the process fluid 104 is considered a "dirty" or "cloggy" fluid that includes, for instance, impurities such as particulates or other material that could clog or otherwise detrimentally affect operation of the valve 106 should the pressure of such fluid 104 be directly used by the valve 106 to control modulation or position (percent open) of the valve 106. Example process fluids 104 include, for example, oil or derivatives thereof (for example, fractions of crude oil).

In FIG. 1, the tubular conduit 102 has a circular cross-section, but other example implementations of the tubular conduit 102 can have other shaped cross-sections. Although the term "tubular conduit" is used herein, the tubular conduit 102 can be made of or include multiple tubular members that are coupled (for example, threadingly or otherwise) together to make up a string of tubular members that collectively construct the tubular conduit 102. The tubular conduit 102 may be located at or above a terranean surface or under the terranean surface (such as underwater or underground in one or more subterranean formations.

The valve 106, in this example, is coupled to the tubular conduit 104 (for example, threadingly, soldered, brazed, or through welded flanges) so that the process fluid 104 flows through the valve 106 during circulation through the tubular conduit 102. An actuator 108 operates (as explained in more detail below) to control and adjust a position (for example, percent open) of the valve 106 based (directly or indirectly) on the pressure of the process fluid 104.

The example implementation of the self-regulating valve system 100 in this figures includes a seal isolator 110 (also called a remote seal isolator) coupled to the tubular conduit 102 downstream of the valve 106. Here, "downstream" refers to a position of the seal isolator 110 such that a portion of the process fluid 104 flows through the valve 106 prior in time to flowing past the seal isolator 110. As described later, the seal isolator 110 includes a portion that is exposed to the process fluid 104 and therefore, is exposed to and senses a pressure of the process fluid 104. The pressure of the process fluid 104 sensed by the seal isolator 110 can be transmitted (for example, at a 1:1 ratio) to (directly or indirectly) the valve actuator 108 to control operation of the valve 106.

The seal isolator 110 is communicably coupled to a controller 112. In some aspects, for example, the controller 112 is or includes a pneumatic controller 112 that regulates (for example, cleans and controls) an amount of air (or other gas such as nitrogen) used as a pneumatic signal to the valve actuator 108. The controller 112 is operable to receive a pressure signal 116 from the seal isolator 110 that is reflective of (for example, in a 1:1 ratio or otherwise) the pressure of the process fluid 104. For instance, the controller 112, in some aspects, is a pneumatic controller that takes the fluid pressure from the remote seal isolator 110 and allows an appropriate instrument air pressure to pass through the controller 112 towards a valve positioner 114 (for example, exclusive of electronics).

The controller 112 is communicably coupled to a valve positioner 114 through a signal 118. In some aspects, the valve positioner 114 comprises a pneumatic positioner used to convert a force (in the form of the signal 118) from the controller 112 into an equivalent pneumatic force signal 120. The pneumatic force signal 120 is provided to the valve actuator 108.

In this example implementation, the self-regulating valve system 100 includes one or more pneumatic (for example, air) regulators 141 that are fluidly coupled to a pneumatic (for example, air) supply 143. In this example, one of the pneumatic regulators 141 is coupled to the pneumatic supply 143 and the controller 112 to provide a supply of regulated (for example, clean) fluid to the controller 112. Another of the pneumatic regulators 141 is coupled to the pneumatic supply 143 and the valve positioner 114 to provide a supply of regulated (for example, clean) fluid to the valve positioner 114. As shown in FIG. 1, the pneumatic supply 143 can be circulated to both pneumatic regulators 141 as the arrows indicate. Each supply of pneumatic fluid, for example, to the controller 112 and the valve positioner 114, can be adjusted and passed (for example, as a pressure signal 118 or a pneumatic force signal 120, respectively) based on operation of the self-regulating valve system 100.

In an example operation of the self-regulating valve system 100, as the process fluid 104 through the tubular conduit 102, a pressure of the process fluid 104 is sensed by the seal isolator 110 (a portion of which is exposed to the process fluid 104). The pressure of the process fluid 104 is sensed by the seal isolator 110 and provided as a pressure signal 116 to the controller 112. In some aspects, the controller 112 passes the pressure signal 116 to the valve positioner 118 as a pressure or force in the signal 118. The positioner 114 converts the signal 118 to the pneumatic force signal 120 and provides the signal 120 to the valve actuator 108. Based on a magnitude of the pneumatic force signal 120 (for example, greater or less than a setpoint of the actuator 108), the actuator 108 operates to open or close the valve 106.

Figure 2A:
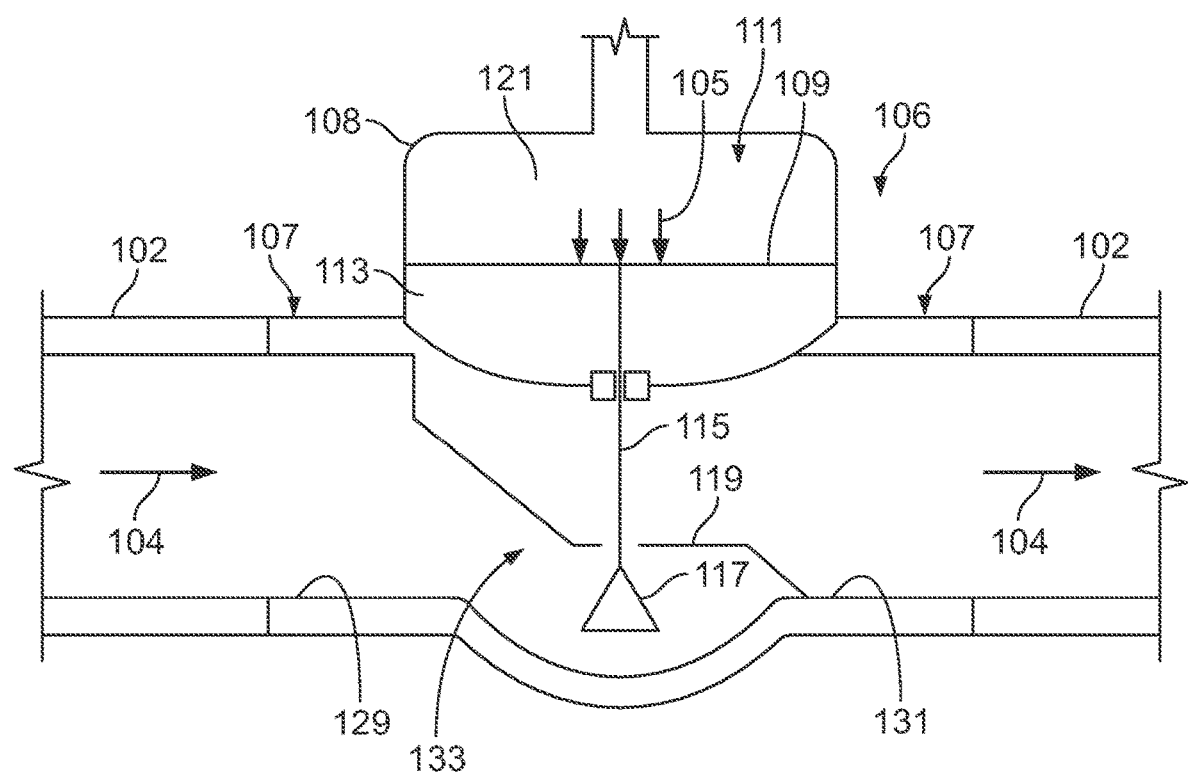
FIG. 2A is a schematic diagram of a valve used in a self-regulating valve system according to the present disclosure.

FIG. 2A is a schematic diagram of the valve 106 used in the self-regulating valve system 100 according to the present disclosure. Generally, in this example implementation, the valve 106 comprises a plug-valve that includes a moveable or shiftable diaphragm that adjust a position of a plug toward or away from a seat based on a pressure applied to the diaphragm. For example, as shown in FIG. 2A, the valve 106 includes a body 107 that is coupled to the tubular conduit 102 at an inlet 129 and an outlet 131 such that the process fluid 104 flows through a flow path 133 of the valve body 107 when the valve 106 is open and does not flow through the flow path 133 of the valve body 107 when the valve 106 is closed. In some aspects, the valve body 107 is or includes an anti-cavitation trim. The anti-cavitation time, in some aspects, includes a heliacal structure built of hardened material to withstand cavitation.

A plug 117 is positioned in the valve body 107 and within the flow path 133. The plug 117 is coupled to a diaphragm 109 and moveable toward and away from a seat 119 based on movement of the diaphragm 109. The plug 117 is coupled to the diaphragm 109 with a stem 115. When the plug 117 is in contact with the seat 119 (in other words, "seated" on the seat 119), the flow path 133 is fluidly sealed against a flow of the process fluid 104 through the valve body 107 from the inlet 129 to the outlet 131. When the plug 117 is not in contact with the seat 119 (in other words, "unseated" from the seat 119), the flow path 133 is fluidly open to a flow of the process fluid 104 through the valve body 107 from the inlet 129 to the outlet 131. As the plug 117 is moved further away from the seat 119, a percent opening of the valve 106 increases, thereby increasing a volumetric flowrate of the process fluid 104 through the valve 106. As the plug 117 is moved closer to the seat 119, a percent opening of the valve 106 decreases, thereby decreasing the volumetric flowrate of the process fluid 104 through the valve 106.

As shown in FIG. 2A, the diaphragm 109 is mounted in an inner volume 111 of the valve actuator 108 and divides the inner volume 111 into a top portion 121 and a bottom portion 113. A working fluid 105 is contained in the top portion 121 of the inner volume 111. In some aspects, a pressure of the working fluid 105 (for example, air or other fluid) is adjusted or controlled by the pneumatic force signal 120 provided by the valve positioner 114. The pressure of the working fluid 105 acts on the diaphragm 109 (as shown by arrows) to keep the diaphragm 109 at a particular pressure, move the diaphragm 109 to adjust the plug 117 toward the open position, or move the diaphragm 109 to adjust the plug 117 toward the closed position. The pressure of the working fluid in the top portion 121, therefore, is the same as or directly related to a pressure of the process fluid 104 (through the pneumatic force signal 120).

Adjustment of the diaphragm 109 by the working fluid 105 can occur based on a relative pressure difference between the working fluid 105 and a present pressure of the bottom portion 113 of the inner volume 111 (for example, a setpoint pressure of the actuator 108). For example, if the pressure of the working fluid 105 is equal to or substantially equal to the setpoint pressure, the diaphragm 109 may remain at a set position (for example, the plug 117 remains stationary and the opening percentage of the valve 106 is unchanged). If the pressure of the working fluid 105 is greater than the setpoint pressure, the diaphragm 109 may move into the bottom portion 113 (for example, the plug 117 moves away from the seat 119 and the opening percentage of the valve 106 increases). If the pressure of the working fluid 105 is less than the setpoint pressure, the diaphragm 109 may move into the top portion 121 (for example, the plug 117 moves toward the seat 119 and the opening percentage of the valve 106 decreases).

Figure 2B:
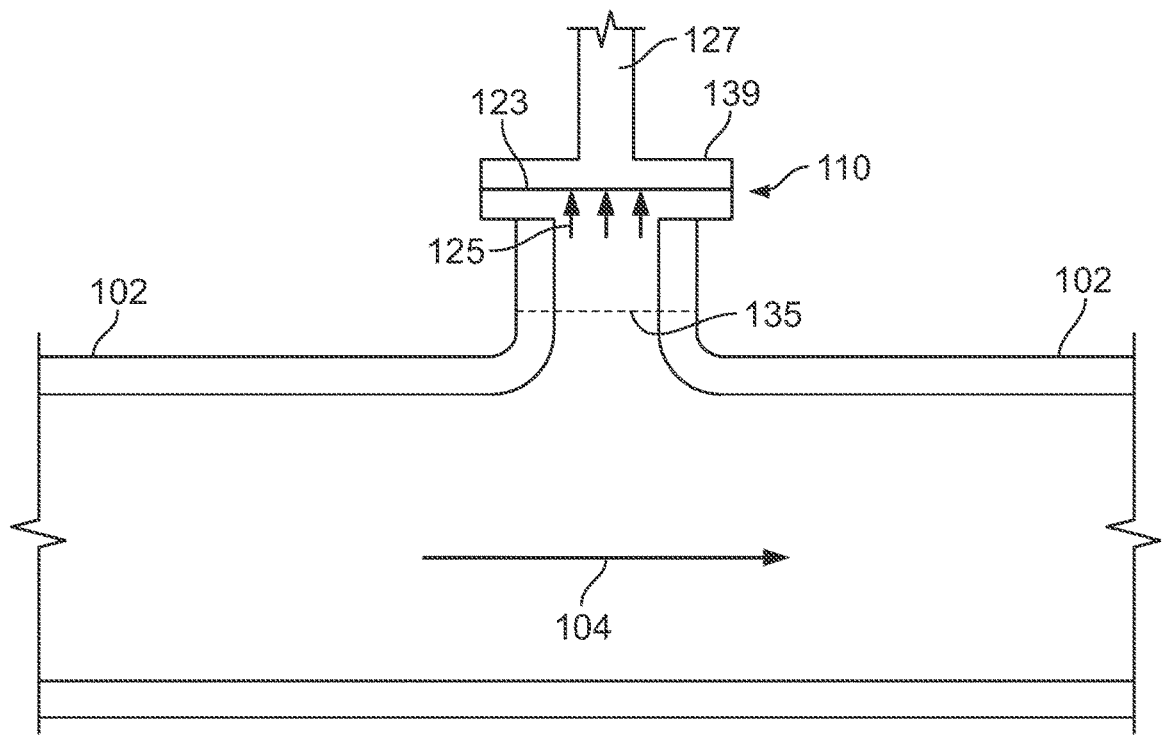
FIG. 2B is a schematic diagram of a seal isolator used in a self-regulating valve system according to the present disclosure.

FIG. 2B is a schematic diagram of the seal isolator 110 used in the self-regulating valve system 100 according to the present disclosure. As shown in FIG. 2B, the seal isolator 110 is coupled to the tubular conduit 102, such as through an opening 135 made in the tubular conduit 104. The seal isolator 110 is coupled (for example, threadingly, welded, brazed, soldered, or otherwise) to the opening 135 of the tubular conduit 102 so that the process fluid 104 is contactingly exposed to a diaphragm 123 of the seal isolator 110. The diaphragm 123 divides an interior volume of a housing 139 of the seal isolator 110 so that the process fluid 104 applies a pressure 125 on one side of the diaphragm 123, while another side of the diaphragm 123 is fluidly isolated from the process fluid 104. A working fluid 127 can be enclosed on the other side of the diaphragm 123 opposite the process fluid 104 at the pressure 125. The diaphragm 123 is operable to transmit the pressure 125 of the process fluid 104 to the working fluid 127, which is provided at the pressure of the process fluid 104 to the controller 112 as pressure signal 116

In some aspects, the seal isolator 110 comprises a tube connected to a sealed portion that is or acts as a Bourdon tube and is filled with a suitable hydraulic liquid on the side of the diaphragm 123 opposite the process fluid 104. The diaphragm 123 can comprise a thin, flexible membrane that divides the isolator housing 139. Movement of the diaphragm 123 based on the pressure 125 of the process fluid 104 exposed to the membrane transmits the pressure 125 (for example, at a one-to-one ratio) through the sealed working fluid 127 (for example, capillary liquid) to the controller 112.

Figure 3:
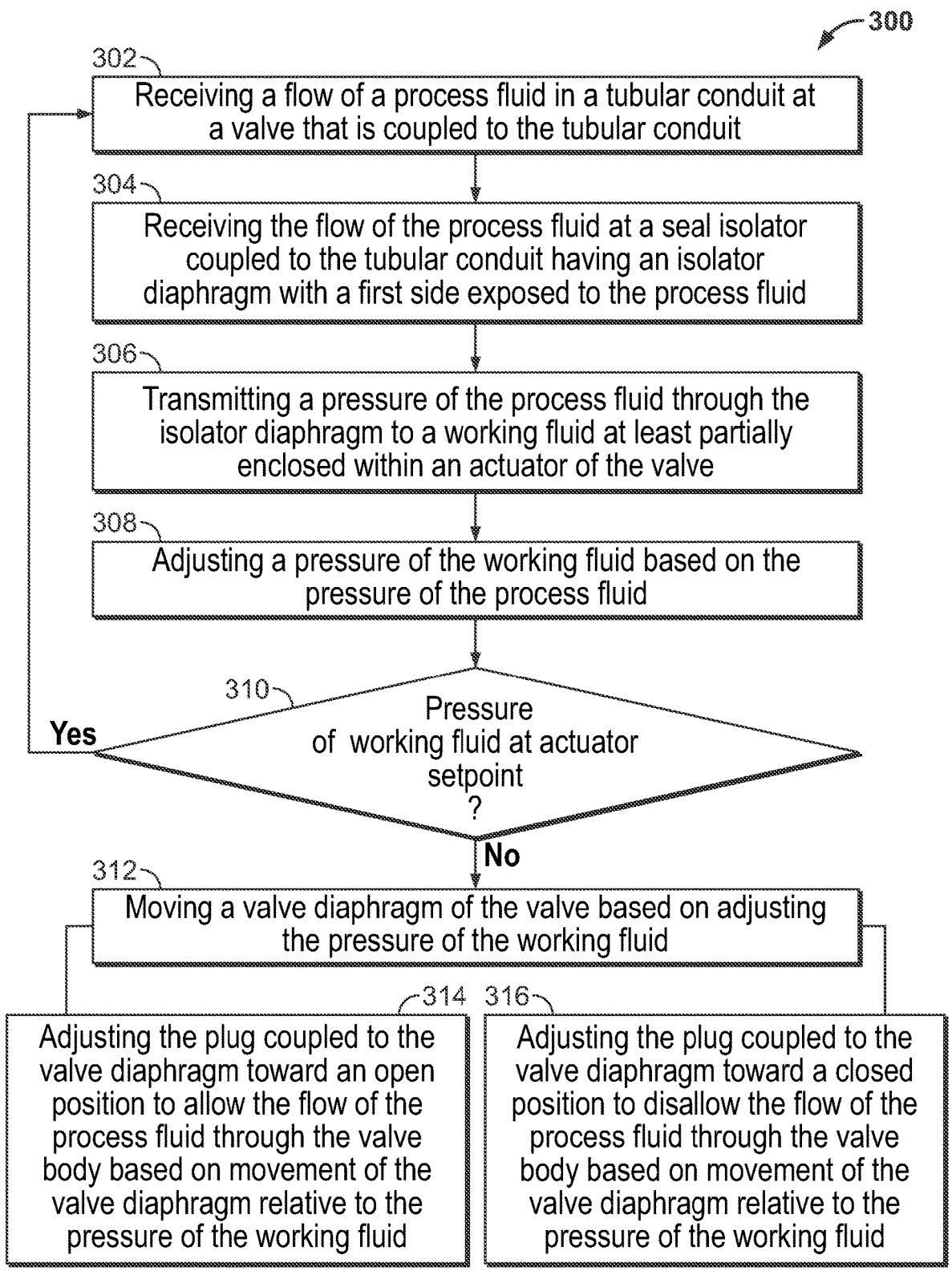
FIG. 3 is a flowchart of an example method of operating a self-regulating valve system according to the present disclosure.

FIG. 3 is a flowchart of an example method 300 of operating a self-regulating valve system according to the present disclosure. In some aspects, method 300 can be implemented by or with the self-regulating valve system 100. Method 300 can begin at step 302, which includes receiving a flow of a process fluid in a tubular conduit at a valve that is coupled to the tubular conduit. For example, a process fluid, such as a hydrocarbon fluid (for example, gas, liquid, or mixed phase) can be circulated through a tubular conduit, such as a pipeline or pipeline system through a valve mounted in the pipeline. The valve, in this example implementation, can be a control or modulating valve that is pneumatically operated by a pneumatic actuator that adjusts a position of the valve (for example, percent open position) based on a pneumatic pressure signal.

Method 300 can continue at step 304, which includes receiving the flow of the process fluid at a seal isolator coupled to the tubular conduit having an isolator diaphragm with a first side exposed to the process fluid. For example, in this example, a seal isolator (such as a remote seal isolator) is positioned downstream of the valve. In some examples, the seal isolator operates to sense a pressure of the process fluid that is exposed to a side of a diaphragm of the seal isolator. The isolator diaphragm, in some aspects, is a membrane that fluidly separates the process fluid from other portions of the seal isolator but moves relative to a pressure of the process fluid.

Method 300 can continue at step 306, which includes transmitting a pressure of the process fluid through the isolator diaphragm to a working fluid at least partially enclosed within an actuator of the valve. For example, the pressure of the process fluid can be transmitted, for example at a one-to-one ratio or other ratio, to a working fluid of the valve actuator by movement of the isolator diaphragm. In some aspects, the pressure of the process fluid can be transmitted directly to the working fluid of the valve actuator, such as when the working fluid of the valve actuator is fluidly coupled to the seal isolator and exposed to a side of the isolator diaphragm opposite the process fluid.

Alternatively, such as shown in FIG. 1, the pressure of the process fluid can be transmitted indirectly to the working fluid of the valve actuator. For example, another working fluid separate from the working fluid of the valve actuator (an "isolator working fluid"), such as glycerin or other hydraulic fluid, can be enclosed within the seal isolator and exposed to the isolator diaphragm opposite the process fluid. The pressure of the process fluid can be transmitted through the isolator diaphragm to the isolator working fluid, which in turn, is provided to a fluid controller (such as controller 112). The fluid controller, such as an air regulator and controller, can receive a pressure signal from the seal isolator in the form of the pressure of the isolator working fluid.

In turn, the fluid controller supplies a pressure signal (for example, in the form of an amount of air at a particular pressure) to a valve positioner (for example, valve positioner 114). The pressure signal from the fluid controller can be a pneumatic signal at a pressure relative to or based on (for example, a one-to-one ratio or otherwise) the pressure of the isolator working fluid, which in turn is based on (for example, a one-to-one ratio or otherwise) the pressure of the process fluid.

In turn, the valve positioner can convert the or transmit the pressure signal from the controller to an equivalent pneumatic force and provide the pneumatic force to the valve actuator. The pneumatic force provided to the valve actuator, therefore, can be relative to or based on (for example, in a one-to-one ratio or otherwise) the pressure of the process fluid that is indirectly transmitted to the working fluid of the valve actuator.

Method 300 can continue at step 308, which includes adjusting a pressure of the working fluid based on the pressure of the process fluid. For example, by transmitting the pressure of the process fluid (directly or indirectly), to the working fluid of the valve actuator, the pressure of the working fluid in the valve actuator can be adjusted to match (or substantially match) the pressure of the process fluid.

Method 300 can continue at step 310, which includes making a determination of whether the adjusted pressure of the working fluid is at a pressure setpoint of the valve actuator. For example, a valve diaphragm of the valve actuator that is exposed to the working fluid can be set at a particular pressure such that, for instance, if the pressure of the working fluid is sufficiently different than the setpoint (for example, greater than or less than), the diaphragm can be moved or adjusted by the working fluid. If the determination in step 310 is yes, then method 300 can return to step 302 (for example, without adjusting a position of the valve).

If the determination in step 310 is no, then method 300 can continue at step 312, which includes moving the valve diaphragm of the valve based on adjusting the pressure of the working fluid. From step 310, method 300 can continue at step 314 if movement of the valve diaphragm opens the valve. Step 314 includes adjusting a plug coupled to the valve diaphragm toward an open position to allow the flow of the process fluid through the valve body based on movement of the valve diaphragm relative to the pressure of the working fluid. For example, as the valve diaphragm is adjusted based on the pressure of the working fluid (for example, above the setpoint), the plug is adjusted to open the valve towards a fully open position.

From step 310, method 300 can continue at step 316 if movement of the valve diaphragm closes the valve. Step 316 includes adjusting a plug coupled to the valve diaphragm toward a closed position to disallow the flow of the process fluid through the valve body based on movement of the valve diaphragm relative to the pressure of the working fluid. For example, as the valve diaphragm is adjusted based on the pressure of the working fluid (for example, below the setpoint), the plug is adjusted to close the valve towards a fully closed position.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A valve system, comprising:
a valve comprising:
a valve body that comprises an inlet configured to couple to a tubular conduit operable to circulate a flow of a process fluid, and an outlet configured to couple to the tubular conduit,
an actuator that comprises an interior volume divided by a valve diaphragm into a first volume portion that at least partially encloses a working fluid and a second volume portion, and
a plug coupled to the valve diaphragm and operable to move toward an open position to allow the flow of the process fluid through the valve body or toward a closed position to disallow the flow of the process fluid through the valve body based on movement of the valve diaphragm relative to a pressure of the working fluid;
a seal isolator coupled to the tubular conduit, the seal isolator comprising an isolator diaphragm having a first side exposed to the flow of the process fluid and a second side fluidly coupled to the first volume portion through the working fluid, the isolator diaphragm configured to transmit a pressure of the flow of the process fluid to the pressure of the working fluid;
a valve positioner configured to convert a signal reflective of the pressure of the flow of the process fluid to a pressure force signal provided to the actuator;
a controller in fluid communication with the second side of the isolator diaphragm and the first volume portion of the actuator though the valve positioner, the controller configured to generate the signal reflective of the pressure of the flow of the process fluid and provide the signal to the valve positioner; and
a plurality of working fluid regulators that is fluidly coupled to a working fluid supply, the controller, and the valve positioner, the plurality of working fluid regulators comprising:
a first working fluid regulator fluidly coupled between the valve positioner and the working fluid supply and configured to provide a cleaned flow of the working fluid to the valve positioner, and
a second working fluid regulator fluidly coupled between the controller and the working fluid supply and configured to provide a cleaned flow of the working fluid to the controller.

2. The valve system of claim 1, wherein the seal isolator is configured to couple to the tubular conduit downstream of the valve body.

3. The valve system of claim 1, wherein the isolator diaphragm is configured to transmit the pressure of the flow of the process fluid to the working fluid at a one-to-one ratio.

4. The valve system of claim 1, wherein the working fluid comprises a gas.

5. The valve system of claim 4, wherein the gas comprises air.

6. The valve system of claim 4, wherein the controller comprises a pneumatic controller.

7. The valve system of claim 1, wherein the pressure signal comprises a capillary fluid.

8. The valve system of claim 1, working fluid supply comprises a pneumatic supply.

9. The valve system of claim 1, wherein the valve diaphragm fluidly separates the process fluid from a first side of the valve diaphragm that is exposed to the working fluid in the first volume portion, and a second side of the valve diaphragm is exposed to the process fluid.

10. A method, comprising:
receiving a flow of a process fluid in a tubular conduit at a valve, the valve comprising a valve body that comprises an inlet coupled to the tubular conduit and an outlet coupled to the tubular conduit;
receiving the flow of the process fluid at a seal isolator coupled to the tubular conduit, the seal isolator comprising an isolator diaphragm having a first side exposed to the flow of the process fluid;
transmitting a pressure of the process fluid through the isolator diaphragm to a working fluid at least partially enclosed within an actuator of the valve;
generating a pressure signal with a controller in fluid communication with the isolator diaphragm and the actuator based on the pressure of the flow of the process fluid;
adjusting, based on the pressure signal from the controller, the pressure of the working fluid with a pressure force signal from a valve positioner coupled to the actuator, the pressure force signal based on the pressure signal;
moving a valve diaphragm of the valve based on adjusting the pressure of the working fluid;
adjusting a plug coupled to the valve diaphragm toward an open position to allow the flow of the process fluid through the valve body or a closed position to disallow the flow of the process fluid through the valve body based on movement of the valve diaphragm relative to the pressure of the working fluid; and
circulating the working fluid from a working fluid source to a plurality of working fluid regulators, the controller, and the valve positioner, the circulating comprising:
circulating a first flow of the working fluid from the working fluid source to a first working fluid regulator to provide a first cleaned flow of the working fluid to the valve positioner, and
circulating a second flow of the working fluid from the working fluid source to a second working fluid regulator to provide a second cleaned flow of the working fluid to the controller.

11. The method of claim 10, wherein receiving the flow of the process fluid at the seal isolator comprises receiving the flow of the process fluid at the seal isolator downstream of the valve body.

12. The method of claim 10, wherein transmitting the pressure of the process fluid through the isolator diaphragm to the working fluid comprises transmitting the pressure of the process fluid through the isolator diaphragm to the working fluid at a one-to-one ratio.

13. The method of claim 10, wherein the working fluid comprises a gas.

14. The method of claim 13, wherein the gas comprises air.

15. The method of claim 10, wherein generating the pressure signal comprises generating the pressure signal with a capillary fluid.

16. The method of claim 10, the working fluid source comprises a pneumatic supply.

17. The method of claim 10, wherein the valve diaphragm fluidly separates the process fluid from a first side of the valve diaphragm that is exposed to the working fluid in the first volume portion, and a second side of the valve diaphragm is exposed to the process fluid.

18. The method of claim 10, wherein the process fluid comprises an untreated hydrocarbon fluid.

* * * * *

UNITED STATES PATENT AND TRADEMARK OFFICE
CERTIFICATE OF CORRECTION

PATENT NO. : 11,719,361 B2
APPLICATION NO. : 17/171609
DATED : August 8, 2023
INVENTOR(S) : Alshammari It is certified that error appears in the above-identified patent and that said Letters Patent is hereby corrected as shown below:

In the Claims

Column 9, Line 31, Claim 1, please replace "though" with -- through --.

Signed and Sealed this
Third Day of October, 2023

Katherine Kelly Vidal
*Director of the United States Patent and Trademark Office*